United States Patent Office 3,220,432
Patented Nov. 30, 1965

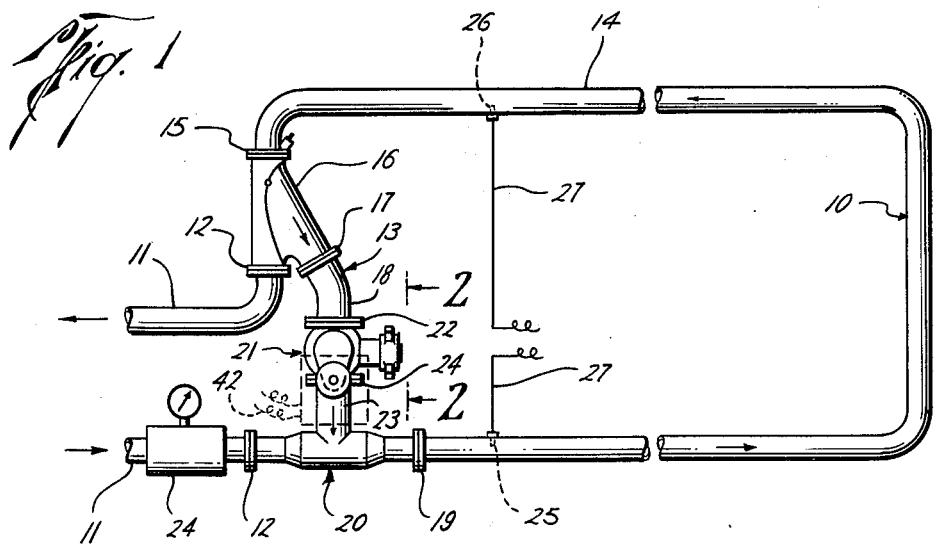
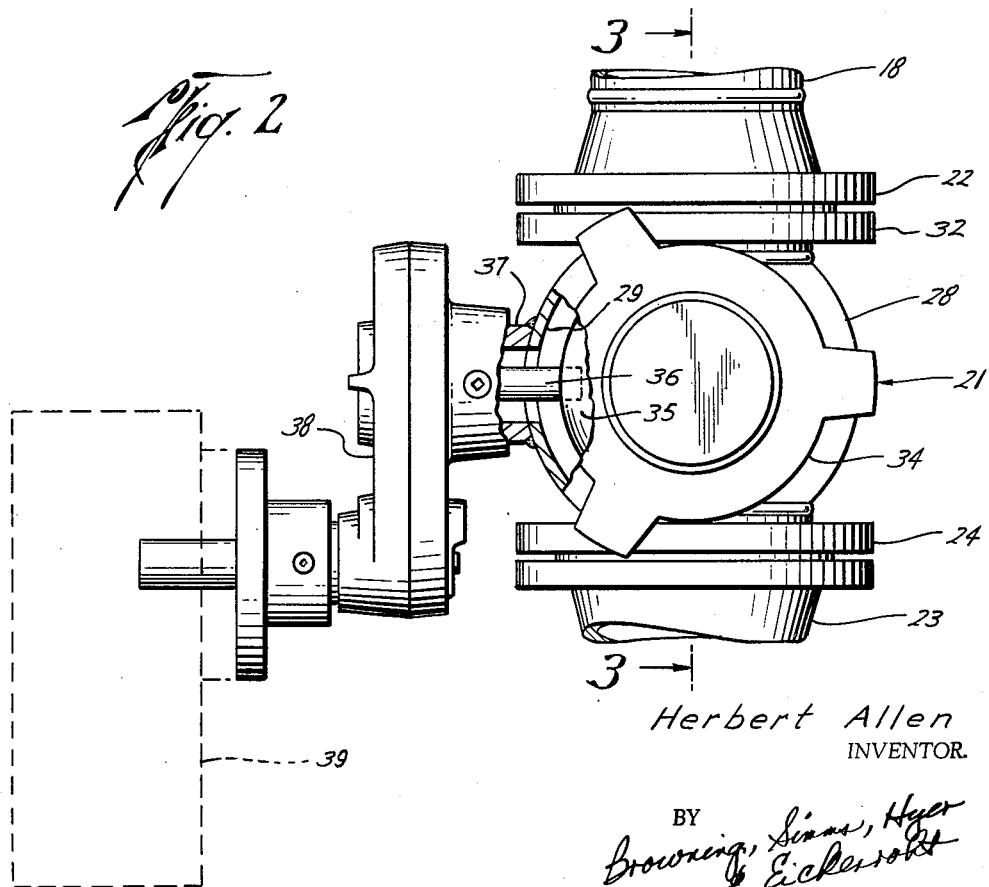

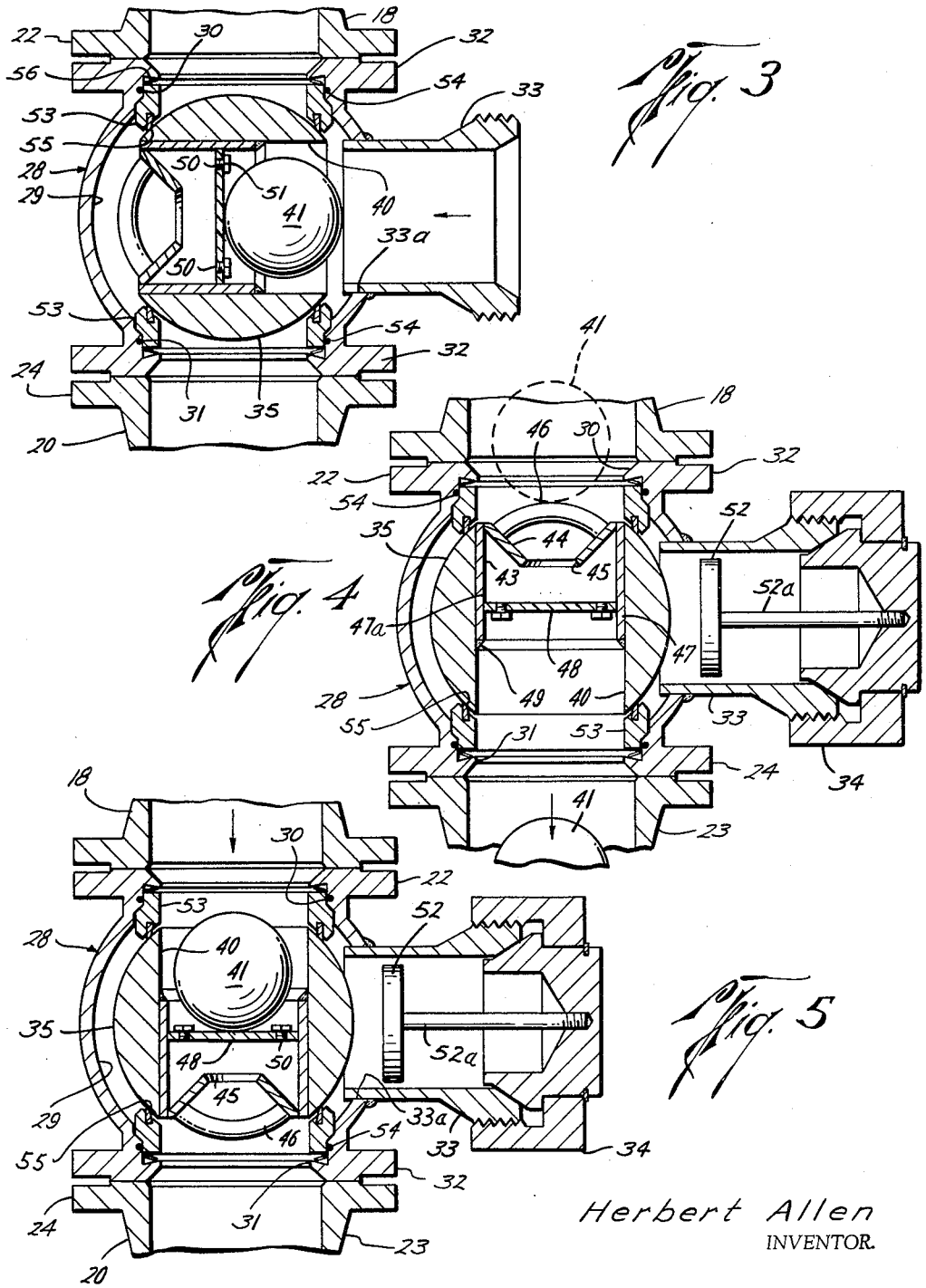

3,220,432
PIPELINE SEPARATOR LAUNCHING DEVICE
Herbert Allen, Houston, Tex., assignor to Cameron Iron
Works, Inc., Houston, Tex., a corporation of Texas
Filed July 19, 1963, Ser. No. 296,202
10 Claims. (Cl. 137—268)

This invention relates in general to an improved device for launching a separator into a pipeline. When so launched, the separator, which is often referred to as a "pig," is propelled through the line in sliding engagement therewith so as to clean and/or separate measurable amounts of fluid therein. This invention relates more particularly to a device of this type which is especially useful in the launching of a separator into a meter prover loop.

In one method of proving of a meter, a ball-shaped separator is launched into a loop connected in the pipeline adjacent the meter and caused to traverse a portion thereof of known volume. The interval which the separator requires in traversing this portion of the loop is detected and the resulting volume of flow of fluid through the line is compared with the meter reading for the detected interval. The loop includes a bypas between the upstream and downstream portions of the line which are connected to the pipeline, and the device for launching the separator is disposed within the bypass so that its operation does not interfere with normal flow through the line.

Conventional devices of this type include a tubular body connectible in the bypass of the loop and containing a plug for receiving a separator and rotatable within a passageway through the body between positions for launching the separator into the upstream portion of the loop, retrieving it from the downstream portion of the loop for subsequent launching, and permitting it to be inserted into or removed from the plug through a side opening in the body, whereby said separator may be replaced or repaired. During the time the separator is traversing the measured portion of the loop, the passageway should be closed so as to prevent the bypassing of fluid through the launching device, which would detract from the accuracy of the meter proving operation.

Debris within the line and pushed ahead of the separator is diverted into the bypass in which the launching device is disposed and accumulates on the plug within the body of such device. This debris finds its way between the plug and the seating surfaces on the body, particularly as the plug is rotated between its various positions. The resulting damage to these surfaces prevents the plug from sealing across the passageway so that some fluid will bypass the device as a result of which the accuracy of the loop is impaired.

It is therefore an object of this invention to provide such a device in which the plug will maintain a seal across the passageway and thereby prevent a fluid bypass during the measuring traverse of the separator despite the accumulation of debris above the plug.

Another object is to provide a device which, in addition to performing its separator launching function, will permit the debris to be collected before it finds its way into the seating surfaces between the plug and body and then disposed of as required from time to time.

Still another object is to provide such a device in which the debris may be collected and then easily and quickly removed without undue modification of the conventional launcher structure, and particularly without the need for additional side openings in the launcher body.

A further and still more particular object is to provide such a device in which only the plug of the scraper launcher need be modified.

These and other objects are accomplished, in accordance with the illustrated embodiment of the present invention, by a device of this type in which the plug has means thereon for trapping debris from the loop ahead of the separator to be retrieved by said plug. More particularly, there is a recess in a side of the plug and the plug is rotatable into a position to dispose the recess opposite the inlet to the passageway through the body of the separator launching device. In this position, the plug nevertheless closes the passageway so that fluid flow within the pipeline will not bypass the device and thus interfere with the measuring function of the meter prover loop. When debris has been collected in this recess, the plug may be rotated to a position in which the recess is disposed opposite the side opening in the body, whereby the debris may be removed from the device through such opening.

In a preferred embodiment of the invention, this recess is disposed in debris trapping position when the plug is rotated into a position for launching the separator therefrom. Thus, upon launching the separator, the plug may be left in this position so as to collect debris from the loop during the entire traverse of the separator within the loop. When the separator has completed the traverse, the plug may be rotated into a position for retrieving the separator from the downstream portion of the loop and then back into launching position, as in conventional devices of this type, in which latter position the recess is automatically disposed in debris trapping position.

In order that the debris will remain trapped within the recess during rotation of the plug between separator retrieving and launching positions, and until such time that the accumulated debris is to be removed from the device in the manner previously described, a plate having an opening therethrough is disposed over the recess. More particularly, the plate is of a conical shape with its apex tapering toward the inner end of the recess so that debris will remain trapped therein regardless of the vertical disposition of the plug. Still further, there is a means over the recess for holding the separator above the recess when it has traversed the loop and returns to a position in which it may be retrieved by the plug. In this manner, the plug is free to rotate from debris trapping position to a position for retrieving the separator for again launching same, without interference from the separator.

In the drawings, wherein like reference characters are used throughout to designate like parts:

FIG. 1 is an elevational view of a meter prover loop connected in a pipeline adjacent a meter for measuring the flow therethrough and including a separator launching and retrieving device constructed in accordance with the present invention;

FIG. 2 is an enlarged side view of the device, as seen along broken line 2—2 thereof;

FIG. 3 is a sectional view of the device, as seen along broken line 3—3 of FIG. 2, and with the plug therein disposed in a position to permit the separator to be inserted therein through the side opening in the body;

FIG. 4 is a view similar to FIG. 3, but with the plug moved to a position for launching the separator into the upstream portion of the loop and trapping debris from the downstream portion of the loop; and FIG. 5 is another view similar to FIGS. 3 and 4, but with the plug moved to a further position to permit a separator to enter the plug from the downstream portion of the loop so that it then may be moved either to the separator launching position of FIG. 4 or the position of FIG. 3 in which the separator may be removed through the side opening of the body.

With reference now to the details of the above-described drawings, a loop 10 is shown in FIG. 1 to have its upstream and downstream portions connected to a pipeline 11 by means of flanged couplings 12 and to include a bypass 13 between such upstream and downstream portions. An intermediate run 14 of the loop is bent into a U-shape having its upper end connected by a flanged coupling 15 to a Y fitting 16. One branch of this fitting is connected by the coupling 12 to the pipeline 11 and the other branch thereof is connected by coupling 17 to an elbow 18 in the bypass 13. The lower end of the U-shaped intermediate pipe run 14 is connected by means of coupling 19 to a T fitting 20 connected at its opposite end to the pipeline 11 by means of the coupling 12. The device 21 for launching and receiving the separator, in a manner to be described, is connected at its upper end to the elbow 18 by a coupling 22 and at its lower end to the branch 23 of the T fitting 20 by means of a coupling 24.

As also shown in FIG. 1, a meter 24 is disposed in the pipeline just upstream of the meter prover loop 10. When a separator is launched from the device 21 into the loop, it will fall into the T fitting 20 and then be forced by line fluid to the right and into the U-shaped pipe run 14, as indicated by the arrows in FIG. 1. The separator is then forced through the upstanding portion of the pipe run 14, to the left through the upper portion thereof, and into the Y fitting 16. By means of any suitable apparatus, such as that shown in a copending application Serial Number 296,893, filed on July 19, 1963, by Herbert Allen, entitled "Device for Diverting a Pipeline Separator or Like Object," and assigned to the assignee of the present application, the separator may be diverted into the right-hand branch of the fitting and thus through the elbow 18 back into the device 21. As will be described to follow, the separator is at this time retrieved so that it may again be launched into the upstream portion of the loop.

As shown diagrammatically in FIG. 1, there are a pair of detectors 25 and 26 in the U-shaped pipe run 14 of the meter loop, the first of such detectors being disposed in the lower section of the pipe toward the forward end of the loop and the second such detector being disposed in the upper portion thereof toward the rearward end of the loop. Thus, as indicated by the wires 27, these detectors may be connected with suitable apparatus for recording the interval which the separator requires in traversing the portion of the loop intermediate the detectors. Since this portion has a volume of known value, the operator is able to determine the volume of flow through this portion of the loop, which may in turn be compared with the volume of flow indicated on the meter 24 for this interval to permit checking of the accuracy of the meter. As will be described to follow, during traverse by the separator between the detectors 25 and 26, the device 21 will be closed to flow therethrough so that the entire flow of fluid will be into the downstream portion of the pipeline 11, thereby assuring an accurate reading.

As previously mentioned, and as will be more fully understood from the following description, debris within the meter prover loop will be moved ahead of the separator into the Y fitting 16. Although a goodly portion of this debris will pass into the left-hand branch of the fitting, and thus into the downstream end of the pipeline 11, at least some of such debris will be moved ahead of the separator into the bypass 13 and thus into the device 21. Furthermore, even though the particular diverting device shown in the above-mentioned copending application shields the right-hand branch of fitting 16 from much of the debris, it will be understood that other diverting devices which do not possess this facility may be used.

As shown in each of FIGS. 3, 4 and 5, the device 21 comprises a body 28 having a passageway 29 therethrough with an inlet 30 thereto and an outlet 31 therefrom. There are flanges 32 on the body about each of the inlet and outlet for connection as by bolts (not shown) to similar flanges on each of the elbow 18 and branch 23 of the fitting 20, the connection of these flanges providing the couplings 22 and 24 previously described. Also, there is a nipple 33 on the body having its inner end received through an opening 33a in the side of the valve body 28 for connection with the passageway intermediate the inlet 30 and outlet 31. As shown in each of FIGS. 2, 4 and 5, the open outer end of the nipple 33 may be closed, as desired, by a cover 34 threadedly connected thereto.

A ball-shaped plug 35 is mounted within the passageway 29 for rotation about an axis extending perpendicular to the passageway. More particularly, the plug has a stem 36 extending from one side thereof and into a bonnet 37 extending from the side of the body, all as shown in FIG. 2. The outer end of the stem is in turn connected with suitable gears (not shown) within gear reducer 38, and the latter are in turn connected with a valve operator 39 of any suitable construction, but preferably automatically actuated in a manner to be described below.

As previously mentioned, the plug 35 has a pocket 40 in one side thereof for selective disposal in each of the three positions shown in FIGS. 3, 4 and 5 upon rotation of the plug through the stem 36. In a first of these positions, the pocket 40 is disposed opposite the open inner end of nipple 33, so that a ball-shaped separator 41 may be inserted into it from the nipple, as indicated by the arrow in FIG. 3. Thus, in the use of this device and upon removal of the cover 34 from the outer end of the nipple, the separator may be moved through such nipple and into the pocket 40.

The pocket 40 is not only of a width to receive the separator 41, but is also of sufficient depth that when the separator engages the bottom of the pocket, it is carried by the plug for rotation therewith. That is, as will be appreciated from the description to follow, the outer surface of the ball separator is disposed within a projection of the outer curved surface of the plug so that it will not interfere with the free rotation of the plug between any of the positions shown in FIGS. 3, 4 and 5. As shown in these figures, the separator is narrower than the pocket as well as narrower than the openings through the nipple 33, the inlet and outlet of the fitting. This, of course, facilitates movement of the separator into and out of the pocket during the various operations of the device. On the other hand, the separator is of a size to fit closely within the inner diameter of the pipe U-shaped portion 14 of the meter prover loop so that it will provide a fluid barrier thereacross.

When the separator 41 has been inserted into the pocket of the plug 35, the cover 34 may be disposed over the outer end of the nipple and the plug rotated 90° in a clockwise direction so as to face the pocket 40 toward the outlet 31 of the body, as shown in FIG. 4. In this latter position, the scraper will drop freely from the pocket and thus be launched through the outlet and into the fitting 20 of the loop. As also previously mentioned, the flow of fluid through the pipeline will force the scraper from the fitting 20 through the U-shaped run 14 of the loop and then, by means of the fitting 16 back into the inlet 30 of the fitting.

For reasons previously mentioned, the plug 35 is left in the launching position of FIG. 4 during traverse of the separator 41 between the detectors 25 and 26, because, as will be described to follow, plug 35 will in this position prevent the bypass of fluid flow through the passageway 29 of the body 28. For reasons which will be better understod from the description to follow, the plug is preferably left in the launching position of FIG. 4 until the separator has not only completed its traverse between the detectors, but has also come to rest on the plug, as indicated in broken lines in FIG. 4. At that time, the plug can be rotated 180° to dispose the pocket 40 therein in a position facing the inlet 30 of the body 28 and thereby permit the separator 41 to enter the pocket for rotation with the plug. On the other hand, it may be desired to connect the operator 39 with the detector 26, as by means of wires 42 so as to rotate the plug from the FIG. 4 to the FIG. 5 position automatically in response to actuation of the detector 26 by means of the separator.

At any rate, when the separator 41 has been retrieved in the pocket 40 of the plug 35, it may be relaunched into the meter prover loop by rotation of the plug 180° or, if desired, it may be removed from the device 21 for replacement or repair. In this latter case, the plug is rotated back into the position of FIG. 3 so as to dispose the pocket 40 carrying the separator 41 opposite the opening through nipple 33. The cover 34 on the outer end of the nipple is then removed and the separator pulled or otherwise removed through the nipple. Upon return of this or another separator into the pocket 40 of the plug, the cover can again be disposed over the outer end of the nipple, and the plug rotated into the launching position of FIG. 4.

As previously described, the debris trap comprises a recess 43 on the side of the plug diametrically opposite to the pocket 40. Thus, when the plug is disposed in the launching position of FIG. 4, the recess 43 will face toward the body inlet 30 and the elbow 18 of the meter prover loop with which it is connected. In this manner, the trap will collect debris which is pushed ahead of the separator at least during that portion of the traverse of the separator between detectors 25 and 26, and, when the plug is left in the launching position of FIG. 4 until complete traverse of the separator, the trap will be disposed to receive debris during the entire traverse of the separator. This latter procedure is preferred since all of the debris ahead of the separator will be diverted with it into the device 21 beginning with its entry into the right-hand branch of fitting 16.

As shown in FIGS. 3, 4 and 5, and as also previously described, the trap also includes a plate 44 across the outer end of the recess 43 and having an opening 45 therein through which debris will fall. More particularly, the plate 44 is conical with its apex pointing toward the center of the plug so that when the plug is rotated from the launching position of FIG. 4 to the separator retrieving position of FIG. 5, there will be a tendency for the debris which has fallen into the recess 43 to be retained therein and kept from falling into the portion of the loop with which body outlet 31 is connected. That is, the plate will form in effect an annular trough about the opening 44 for retaining the debris collected therein.

The separator 41 is prevented from entering the recess 43, and particularly from falling onto the conical plate 44, by means of one or more straps or bars 46 connected over the plate 44 and curved to approximately the outer diameter of the plug 35. Thus, as will be appreciated from FIG. 4, this strap will hold the separator 41 in such a position that it will not interfere with free rotation of the plug 35 out of the launching position.

Since the pocket 40 and recess 43 are diametrically opposed to one another, the plug is preferably bored through to receive a frame 47 comprising a sleeve 47a closely fittable within the bore and a plate 48 extending across the sleeve to divide the bore into the pocket 40 and recess 43. More particularly, the conical plate 44 is also carried by the sleeve 47, and the sleeve is welded to the bore at 49 or otherwise securely held and sealed within the bore when the parts of the frame are properly positioned with respect to the plug.

There are a pair of holes 50 through the dividing plate 48 which are normally closed by stoppers 51 threadedly connected thereto. When the debris trap has become full of debris, the plug may be rotated into the position of FIG. 3, and the stoppers 51 removed from the holes 50 to permit air or liquid to be blown through one of the holes in order to force the debris out through the other hole and thus into the nipple 33, from which it may be removed. Upon completion of the cleaning operation during which the separator 41 may be removed from within the device, the openings are again closed by the stoppers 51, the separator returned to the position in which it is carried within the plug 35, and the cover 34 replaced on the nipple, so that the device is again ready for operation. As will be appreciated, the conical shape of the trough about the plate opening 45 will cause a sort of swirling action of the debris, all of which will aid in its removal through the holes 50.

There is a plate 52 carried within the nipple 33 upon a stem 52a attached at its outer end to the cover 34. As shown in FIGS. 4 and 5, when the cover is in place over the outer end of the nipple 33, the face of the plate 52 will be disposed close to the inner open end of the fitting so as to prevent the separator 41 from falling out of the pocket 40 as the plug moves past the FIG. 3 position. More particularly, the plate 52 is so located as to prevent any substantial outward movement of the separator which would interfere with the free turning of the plug between the separator launching and receiving positions.

Annular seats 53 are carried within each of the inlet and outlet of the body for engagement at their inner ends with the outer surfaces of the plug 35. More particularly, the outer diameters of these seats are sealably engaged by seal rings 54 carried within the body. It is, of course, the inner ends of these seats which would be scored by debris which might find its way between them and the plug. When so damaged, the seats would not maintain a seal agaist the plug and fluid would therefore bypass the launching device. As a result, and in the absence of the debris trap above described, the accuracy of the meter loop would be impaired.

As shown in FIGS. 4 and 5, the seal rings 55 on these seats will surround each of the pocket 40 and recess 43 on opposite sides of the plug 35 in either the launching or retrieving position of the plug. Also, when the plug is rotated into the position of FIG. 3, these seats will sealably enclose solid portions of the plug intermediate the pocket and recess therein. Since the seats are sealably slidable within the inlet and outlet, they will be held seated by fluid pressure within the loop, regardless of whether it is predominant above or below the device, so as to close off the passageway in any one of the three positions indicated in FIGS. 3 to 5. In order to provide an initial seal, each seat is also urged into engagement with the plug by means of a spring 56 disposed between its outer end and an inner flange on the inlet or outlet.

Although there will be some bypassing of fluid past the plug as it is turned from any one of the positions of FIGS. 3 to 5 to another position thereof, this would not occur during traverse of the scraper between the detectors 25 and 26. As previously mentioned, however, during this traverse of the scraper, the plug 35 is left in the launching position of FIG. 4 so that the passageway will be completely closed off.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A device for launching a separator into a meter prover loop or the like, comprising a body having a passageway therethrough with an inlet and outlet for connection in the loop and an opening therein connecting with the passageway intermediate the inlet and outlet, a plug located in the passageway through the body between the inlet and the outlet thereof and having a separator receiving pocket therein, means mounting the plug in the body for rotation in the passageway to move the opening between positions to receive a separator therein or discharge a separator therefrom through said opening, to receive a separator through the inlet of the body, and to discharge a separator through the outlet of the body, and means on the plug for trapping debris from said loop ahead of a separator and for retaining said debris as the plug rotates between separator receiving and discharging positions.

2. A device of the character defined in claim 1, wherein said debris trapping means includes a recess in the plug and a conically shaped plate on the plug having an opening therethrough disposed across the recess with its apex extending into the recess.

3. A separator launching device, comprising a body having a passageway therethrough, an inlet to the passageway, an outlet from the passageway, and an opening into the passageway intermediate the inlet and outlet, a plug located in the passageway through the body between the inlet and the outlet thereof and having a pocket in a side thereof to receive a separator, means mounting the plug in the body for rotation in the passageway between a first position in which the pocket is opposite the side opening in the body, a second position in which the pocket is opposite the body inlet, and a third position in which the pocket is opposite the body outlet, a recess in the plug disposable opposite said body inlet for collecting debris therefrom and means on the plug for retaining the collected debris in the recess regardless of the position of the plug.

4. A device for launching a separator into a portion of a pipeline, comprising a body having a passageway therethrough with an inlet thereto and outlet therefrom for connection in the pipeline and an opening therein connecting with the passageway intermediate the inlet and outlet, a plug mounted in the body for rotation in the passageway having a pocket in a side thereof to receive a separator, means for rotating the plug between a first position in which the pocket is opposite a side opening in the body to permit the separator to be inserted into or removed from the pocket, a second position in which the pocket is opposite the body inlet to receive a separator from the pipeline, and a third position in which said pocket is opposite the body outlet to launch a separator received therein into the pipeline, and means on the plug disposable opposite the body inlet when the plug has been rotated into said third position for trapping debris from the pipeline and for retaining said debris as the plug rotates between the three positions.

5. For use in a separator launching device which comprises a body having a passageway therethrough, an inlet thereto and outlet therefrom for connection in a pipeline, and a side opening connecting with the passageway intermediate the inlet and outlet; a plug for locating in such passageway within said such body for rotation therein about an axis perpendicular to the passageway, said plug having a circular cross section perpendicular to said axis and a port extending therethrough in a direction perpendicular to said axis, an imperforate plate secured to the plug and extending across the port dividing it into a pocket on one side of the plug and a recess on the opposite side thereof, whereby said plug is rotatable between positions in which said pocket is selectively disposed opposite one of said body inlet, outlet and side opening and said recess is disposed opposite the body inlet when the pocket is opposite the body outlet, and a conically shaped plate of substantially uniform thickness secured to the plug across the recess with its apex extending into the recess and having a centrally located opening therein through which debris can enter the recess.

6. A plug of the character defined in claim 5, including at least one bar secured to the plug and extending over said conically shaped plate said bar being curved about the same axis with a radius of curvature no greater than the radius of curvature of said plug.

7. A device for launching a separator into and retrieving a separator from a pipeline, comprising, a body having a passageway extending therethrough with an inlet and an outlet for connection between two spaced points in a pipeline, a plug located in the passageway within the body, means on the body rotatably supporting the plug for rotation on an axis transverse the passageway, and means attached to the body and positioned in the passageway to sealingly engage the plug to prevent the flow of fluid through the passageway, said plug having a circular cross section perpendicular to its axis of rotation and a pocket in the side thereof located to move as the plug is rotated from a position facing the inlet of the passageway to receive a separator falling therethrough to a position facing the outlet of the passageway to allow a separator therein to fall through the outlet into a pipeline said plug being further provided with a debris trap for collecting and holding debris that enter the passageway through the inlet comprising, a recess in the side of the plug having an open end for positioning below the inlet to collect debris passing therethrough and a conically-shaped debris retaining plate having a central opening therein attached to the plug across the open end of the recess with its apex extending into the recess to provide a funnel for directing debris into the recess when the recess is positioned below the inlet to the passageway and to form an annular cavity adjacent the upper end of the recess to hold the debris collected in the recess as the plug is rotated to move a separator through the passageway from the inlet to the outlet.

8. A plug as defined in claim 7 further provided with a bar attached to the plug and extending across the open end of the recess above the debris retaining plate within the projections of the sides of the plug adjacent the recess to keep a separator from entering the recess and interfering with the rotation of the plug in the body.

9. For use in a separator launching device for connecting across a meter loop in a pipeline to launch a separator into the loop and retrieve the separator from the loop after it has traveled therethrough, comprising a body having a passageway therethrough with an outlet through which the separator is launched and an inlet through which the separator is retrieved; a plug to be located in the passageway in the body and rotatably supported by the body for moving a separator from the inlet to the outlet of the passageway, the plug having a pocket therein for movement from a position facing the inlet to receive a separator to a position facing the outlet to launch the separator into such loop, said plug being further provided with a recess therein opposite the pocket and having an open end located to be positioned facing the inlet to the passageway to collect debris forced out of the loop into the inlet by a separator traveling therethrough, and a conically-shaped debris retaining plate having a central opening therein attached to the plug and extending across the open end of the recess with its apex extending into the recess to provide a funnel for directing debris into the recess and to form an annular cavity adjacent the open end of the recess to hold the debris collected in the recess regardless of the vertical disposition of the plug.

10. A device for launching a separator into and retrieving a separator from a pipeline, comprising, a body having a passageway extending therethrough with an inlet thereto and an outlet therefrom for connection between two spaced points in a pipeline with the longitudinal axis of the passageway extending generally vertical to allow a separator to be moved by gravity from such pipeline into the inlet of the passageway and out the outlet into such pipline, said body further having a lateral opening connected to the passageway through which a separator can be moved into and out of the passageway, a plug located in the passageway within the body, means rotatably supporting the plug for rotation on an axis transverse the vertical axis of the passageway, and means attached to the body and positioned in the passageway to sealingly engage the plug to prevent the flow of fluid through the passageway, said plug having a circular cross section perpendicular to its axis of rotation and a pocket in the side thereof located to move as the plug is rotated from a position facing the inlet to receive a separator falling therethrough, to a position facing the lateral opening to receive a separator therefrom or discharge one therein, and to a position facing the outlet to allow a separator therein to fall through the outlet of the passageway into a pipeline and means removably attached to the body and positioned in the lateral opening to hold a separator in the pocket as the plug moves past the lateral opening when moving a separator from the inlet to the outlet, said plug being further provided with a debris trap for collecting and holding debris that enters the passageway through the inlet, comprising, a recess in the side of the plug having an open end for positioning below the inlet and a conically-shaped debris retaining plate, having a central opening, therein, attached to the plug across the open end of the recess with its apex extending into the recess to provide a funnel for directing debris into the recess when the recess is positioned below the inlet to the passageway and to form an annular cavity adjacent the upper end of the recess to hold the debris collected in the recess as the plug is rotated to move a separator through the passageway from the inlet to the outlet.

References Cited by the Examiner

UNITED STATES PATENTS

| | | | |
|---|---|---|---|
| 439,667 | 11/1890 | Lange | 4—258 |
| 971,446 | 9/1910 | Hawkins | 137—546 |
| 1,023,616 | 4/1912 | Boldizs | 4—279 |
| 1,131,988 | 3/1915 | Bocorselski | 302—49 |
| 3,125,116 | 3/1964 | Schabergq | 137—268 |

FOREIGN PATENTS 8,950      1894    Great Britain.

M. CARY NELSON, *Primary Examiner.*

HENRY T. KLINKSIEK, *Examiner.*